United States Patent [19]
Gates

[11] 3,774,694
[45] Nov. 27, 1973

[54] FLEXIBLE HARROW DEVICE

[76] Inventor: Robert B. Gates, Loraine, N. Dak. 58753

[22] Filed: Oct. 20, 1971

[21] Appl. No.: 191,029

[52] U.S. Cl.............. 172/617, 172/643, 172/657, 172/763, 172/776
[51] Int. Cl............................................. A01b 19/08
[58] Field of Search................... 172/178, 198, 201, 172/202, 484, 617, 619, 620, 634, 621, 637, 643, 657, 691–693, 763, 776

[56] References Cited
UNITED STATES PATENTS

| | | | |
|---|---|---|---|
| 3,263,757 | 8/1966 | Kaster | 172/198 |
| 2,919,755 | 1/1960 | Kapsch | 172/620 |
| 3,613,802 | 10/1971 | Carlson et al. | 172/197 |
| 2,960,169 | 11/1960 | Collins | 172/202 |
| 3,500,936 | 3/1970 | Vigen | 172/198 |
| 2,985,248 | 5/1961 | Richardson | 172/619 |
| 3,139,942 | 7/1964 | Birkenbach et al. | 172/390 |
| 862,401 | 8/1907 | King | 172/484 |
| 974,377 | 11/1910 | Hattelid | 172/484 |

Primary Examiner—Robert E. Pulfrey
Assistant Examiner—Eugene H. Eickholt
Attorney—Robert E. Kleve

[57] ABSTRACT

The invention comprises a flexible harrow device. The flexile harrow device has a pair of side beams which are pivotally mounted to the rear frame member of a cultivator and extend rearwardly therefrom. The side beams each have a second beam member mounted in a parallel linkage to said first beam member. A plurality of short plate members are pivotally mounted about a horizontal axis to each of the second beam members. Each second beam member has a plate structure attached thereto to pivot about an axis perpendicular to said horizontal axis, with said plate structure being fixed to the harrow support bars carrying the cultivator teeth, to thereby provide a swivel connection between the second beam members of the frame and the harrow bars.

2 Claims, 4 Drawing Figures

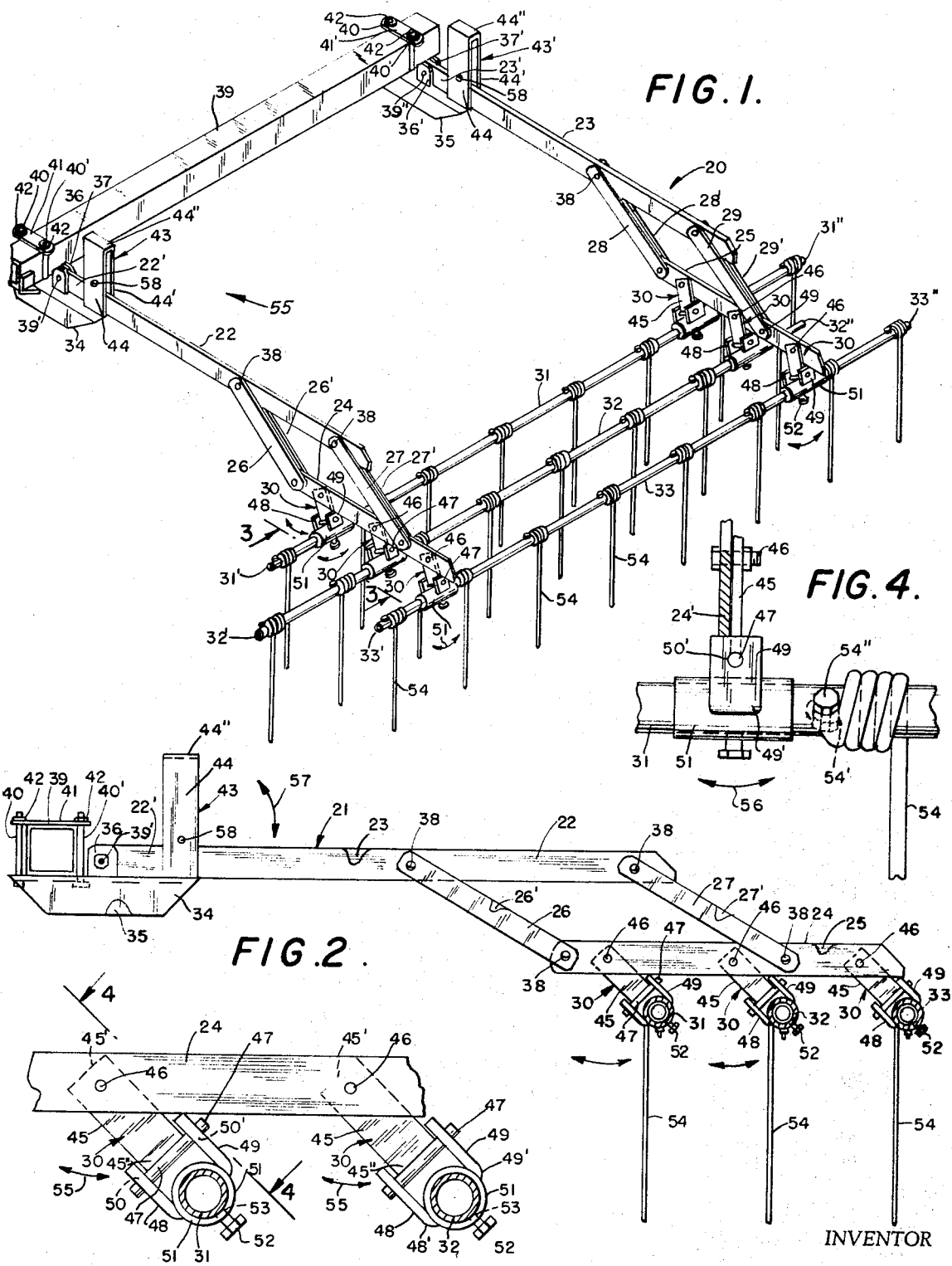

_3,774,694_

FLEXIBLE HARROW DEVICE

This invention relates to agricultural equipment, more particularly, the invention relates to frames for harrows and the like.

It is an object of the invention to provide a novel flexible harrow device which has swivel connections between the outer ends of the harrow support bars carrying the cultivator teeth and the frame to provide a flexible connection therebetween whereby the harrow bars may pivot or flex relative to the frame to adjust to irregular or rocky terrain.

It is another object of the invention to provide a novel flexible harrow device which has a frame pivotally mounted to the rear of a cultivator and has swivel connections between a harrow bar carrying the harrow teeth and the frame to provide a pivotal flexing connection between the harrow bar and frame to adjust to irregular terrain.

It is another object of the invention to provide a novel flexible frame for harrows and the like which has swivel connections to enable the frame to pivot or flex on rocky terrain.

Further objects and advantages of the invention will become apparent as the description proceeds and when taken in conjunction with the accompanying drawings wherein:

FIG. 1 is a perspective view of the flexible harrow invention.

FIG. 2 is a side elevational view of the flexible harrow invention.

FIG. 3 is an enlarged fragmentary cross sectional view of the swivel plate connection for connecting the ends of the harrow bars to the secondary beams of the main frame of the harrow.

FIG. 4 is an enlarged cross sectional view taken along line 4 — 4 of FIG. 3.

Briefly stated the invention comprises a flexible harrow device, said device has a pair of elongated beams pivotally mounted to the rear of a cultivator and projecting rearwardly therefrom, a pair of elongated secondary beam members pivotally connected to the rearward ends of the elongated beams on a parallel linkage and suspended therebeneath, a plurality of short plate members pivotally mounted to the secondary beam members at spaced intervals therealong, said plate members being pivotally mounted to the secondary beam members to pivot about a horizontal axis, a plurality of plate structures pivotally connected to said plate members at their upper ends to pivot about an axis perpendicular to said horizontal axis, a plurality of harrow bars having their outer ends fixed to the lower ends of said plate structure, with said pivotal mounting of said short plate member and plate structure providing a swivel connection between the harrow bars and the secondary bar member of the frame.

Referring more particularly to the drawings, in FIG. 1, the flexible harrow invention 20 is illustrated having a frame 21.

The frame 21 has a pair of main frame members or elongated beams 22 and 23 and a pair of secondary main frame members or elongated beams 24 and 25. The secondary frame members 24 and 25 are pivotally connected to the main frame members 22 and 23, respectively, by dual pair of parallel linkage plates 26 and 27, and 26' and 27', dual pair of parallel linkage members 28 and 29 and 28' and 29', respectively, by bolts 38. The secondary beam members each have a plurality of swivel plate connections 30 which connect the three harrow bars 31, 32, and 33 to the swivel connections at their outer ends, with the swivel connections each pivoting about two axes perpendicular to one another so as to provide a flexible connection therebetween.

FRAME

The elongated main frame members or beams 22 and 23 of the main frame each have their rearward ends pivotally mounted to a pair of horizontal plates 34 and 35 by means of a pair of upright flanges 36 and 37 and 36' and 37' which are fixed to the horizontal plates 34 and 35, respectively, and projected upwardly therefrom.

A bolt 39' passes through bores in the flange 36 and 37 and through a bore in the rearward end 22' of beam 22 to pivotally mount the rearward end 22' of the beam to the flanges 36 and 37 to pivot about a horizontal axis. Similarly, a bolt 39" passes through bores in flanges 36' and 37' and through a bore in the rearward end 23' of the beam 23 to pivotally mount the rearward end of the beam 23 to the flanges 36' and 37'.

The horizontal plates 34 and 35 are attached behind a conventional cultivator to the rectangular tubular rear frame member 39 of the cultivator by means of a pair of bolts 40 and 40' which extend upward through bores in the horizontal plates 34 and 35, along opposite sides of the rear frame member or sleeve 39 of the cultivator. A pair of plates 41 and 41' extend across the top of the tubular frame member. A pair of bolts 40 and 40' project upward through bores in the plates 34 and 35 and through the bores in the top plates 41 and 41'. Nuts 42 are threaded onto the bolts 40 and 40' to secure the tubular frame member 39 to the horizontal plates 34 and 35 and the top plates 41 and 41' to thereby secure the harrow device to the cultivator.

A pair of U-shaped guideways 43 and 43' are mounted to the horizontal plate members 34 and 35. The U-shaped guideways 42 each have side plates 44 and 44' which extend upward on opposite sides of the beams 22 and 23, respectively, with top plate portions 44" fixed across to the upper ends of the side plates 44 and 44', respectively, to form an inverted U-shaped cross-sectional structure for the guideways.

SWIVEL CONNECTIONS

The swivel connections 30 are formed of swivel plates 45 which have their upper ends 45' pivotally mounted to the beam members 24 and 25 by means of bolts 46 which pass through bores at the upper ends of the swivel plates 45 and through bores in the beams 24 and 25. The bolts 46 enable the upper ends of the swivel plates to pivot about the horizontal axis of bolts relative to the secondary frame members 24 and 25.

The swivel plates 45 each have a pin 47 fixed to their lower ends 45". A pair of side plates 48 and 49 have bores 50 and 50' for receiving the ends of the pins 47 to pivotally mount the side plates 48 and 49 to the swivel plates 45 to pivot about the pin 47 in a direction perpendicular to the horizontal axis of the pivotal mounting at the upper end of the swivel plates 45, by the bolt 46, to thereby provide a swivel connection.

The lower ends 48' and 49' of each pair of side plates are fixed to a cylindrical sleeve 51. The sleeves 51 beneath the secondary beam member 24 slidably receive therein the ends 31', 32', and 33' of the cylindrical harrow bars 31, 32, and 33 and the sleeves 51 beneath the secondary beam member 25 slidably receive the opposing ends 31'', 32'', and 33'' of the cylindrical harrow bars.

The cylindrical harrow bars 31, 32 and 33 are rotatably mounted in the sleeves 51. Each cylindrical sleeve 51 has a bolt 52 threaded into a threaded bore 53 in the sleeve 51 which may be tightened against the harrow bars 31, 32, and 33 to lock the harrow bars 31, 32, and 33 in an adjusted fixed position, relative to the sleeves 51.

A plurality of conventional harrow teeth 54 are mounted to the harrow bars 31, 32, and 33 at spaced intervals along the bars 31, 32, and 33 as illustrated in FIGS. 1 and 4. The harrow teeth 54 have an eyelet 54' formed at their lower ends and a bolt 54'' passes through the eyelet and through the harrow bars to mount the teeth to the harrow bars.

OPERATION

The flexible harrow device will be towed behind a cultivator in the direction indicated by the arrow 55, with the harrow teeth 54 engaging the ground to harrow the ground. In the event the harrow teeth along the harrow bars 31, 32, and 33 strike an object in the ground such as a rock, the swivel connections 30 at each of these ends 31', 32', and 33', and 31'', 32'', and 33'' enable the end of each harrow bar to pivot relative to the secondary beam members 24 and 25 about the horizontal axis of the pins 45 and in the direction indicated by the arrow 55 in FIG. 3, and to pivot about the pins 47 relative to the secondary beams 24 and 25 in the direction indicated by the arrow 56 in FIG. 4 along the axis perpendicular to the horizontal axis pins 47.

This action of swivel connections 30 pivoting about the dual axes enable the harrow bars at the particular ends of the harrow bar which encounter the rocks to shift or flex upward as well as sideways to a certain extent when striking an object. This tends to absorb the blow of the rock, and also minimizes the possibilities of the frame members 22 and 23 and 24 and 25 of being bent or broken, and also facilitates the ends of the harrow bars being able to ride or swing up over the rock, without damaging the harrow device.

The harrow device 20 which includes the main beam members, the secondary beam members, the swivel connections, harrow bars, and harrow teeth may also pivot upward about the axis of bolts 38, when the harrow device 20 strikes an object, as indicated by the arrow 57 in FIG. 2, within the limits or confines of guideways 43 and 43' when the harrow device strikes an object such as a rock.

When it is desired to raise the harrow device out of its operative position as generally shown in FIG. 2, the main beam members 21 and 22 will be pivoted upward about the bolts 39 and 39'', until the main beams have pivoted above the bores 58 in the guideways 42 and 43, whereupon, bolts will be inserted into the bores 58 in the guideway to maintain the beams 21 and 22 in the elevated or raised position. The harrow device may be positioned in this raised position for transportation from one field to another or place to place between harrowing operations.

Also, the harrow bars may be raised upward and downward or rise upward and downward by the action of the parallel bars linkage members 26, 27, 26', 27', 28, 28', 29, 29' pivoting relative to the main frame members and secondary frame members 22 and 23, and 24 and 25.

Thus, it will be seen that a novel flexible harrow device has been provided with the ends of the harrow bars being moved about dual axes to provide a swivel connection whereby the harrow bars individually flex or shift to one side or another or upward or downward about their swivel connections at the ends of the harrow bars, when the harrow teeth strike an object such as a rock, to absorb the force of the blow of the rock engaging the harrow teeth.

It will be obvious that various changes and departures may be made to the invention without departing from the spirit thereof, and accordingly it is not intended that the invention be limited to that specifically described in the specification or as illustrated in the drawing, but only as set forth in the appended claims wherein:

I claim:

1. A flexible harrow device for attachment to the rear of a cultivator having a rear frame comprising a pair of elongated first and second side beams, said side beams having their rearward ends pivotally mounted to the rear frame of the cultivator and extending rearwardly therefrom, said side beams each having a pair of relatively short elongated linkage members, a first and second short beam, relatively short in relation to said first and second beams, one of said pair of linkage members having its upper ends pivotally connected to said first side beam and its lower ends pivotally connected to said first short beam to provide a parallel linkage, said other of said pair of linkage members having its upper ends pivotally connected to said second side beam and its lower ends pivotally connected to said second short beam to provide a parallel linkage, a plurality of first short plates pivotally mounted about a horizontal axis to said first and second short beams, a plurality of second short plates pivotally mounted to said first short plates about an axis laterally of said first mentioned axis, a harrow support bar having its ends fixed to the second short plates between said first and second beams, with said pivotal mounting of said first short plates to said short beams and said pivotal mounting of said second short plates to said first short plates providing a pivotal connection about two axes perpendicular to one another at each end of the harrow bar between the harrow bar and frame to thereby provide a flexible connection between the harrow bar and frame for flexing action.

2. A flexible harrow device for attachment to the rear of a cultivator having a rear frame comprising a pair of elongated first and second side beams, said side beams having their rearward ends pivotally mounted to the rear frame of the cultivator and extending rearwardly therefrom, said side beams each having a pair of relatively short elonated linkage members, a first and second short beam, relatively short in relation to said first and second beams, one of said pair of linkage members having its upper ends pivotally connected to said first side beam and its lower ends pivotally connected to said first short beam to provide a parallel linkage, said other of said pair of linkage members having its upper ends pivotally connected to said second side beam and its lower ends pivotally connected to said second short beam to provide a parallel linkage, a plurality of first short plates pivotally mounted about a horizontal axis to said first and second short beams, a plurality of second short plates pivotally mounted to said first short plates about an axis laterally of said first mentioned axis, a plurality of harrow bars each having their one ends fixed to the second short plates of the first beam and first short beam of the frame, said plurality of harrow bars each having their other ends fixed to the second short plates of the second beam of the second short beam of the frame, with said pivotal mounting of said first short plates to said short beams and said pivotal mounting of said second short plates to said first short plates providing a pivotal connection about two axes perpendicular to one another at each end of the harrow bars between the harrow bars and frame to thereby provide a flexible connection between the harrow bars and frame for flexing action.

* * * * *